United States Patent [19]
Kim et al.

[11] Patent Number: 5,444,803
[45] Date of Patent: Aug. 22, 1995

[54] FIBER-OPTIC DEVICES AND SENSORS USING FIBER GRATING

[75] Inventors: Byoung Y. Kim, Seoul; Yeon W. Koh; Seok H. Yun, both of Daejon, all of Rep. of Korea

[73] Assignee: Agency of Defense Development, Rep. of Korea

[21] Appl. No.: 196,641

[22] Filed: Feb. 15, 1994

[30] Foreign Application Priority Data

Apr. 24, 1993 [KR] Rep. of Korea ............... 6932/1993

[51] Int. Cl.⁶ ............................................ G02B 6/26
[52] U.S. Cl. ............................... 385/28; 385/37; 385/13
[58] Field of Search ............ 385/24, 28, 29, 37, 385/42, 11, 12, 13; 356/73.1; 372/6

[56] References Cited

U.S. PATENT DOCUMENTS

| | | | |
|---|---|---|---|
| 4,881,790 | 11/1989 | Mollenauer | 385/15 |
| 4,895,421 | 1/1990 | Kim et al. | 385/28 |
| 4,915,468 | 4/1990 | Kim et al. | 385/123 |
| 5,315,436 | 5/1994 | Lowenhar et al. | 359/569 |

*Primary Examiner*—Frank Gonzalez
*Attorney, Agent, or Firm*—Scully, Scott, Murphy & Presser

[57] ABSTRACT

Fiber-optic devices and sensors are implemented using fiber gratings. The fiber-optic device includes the fiber grating, an input mode stripper and an output mode stripper placed at both ends of the fiber grating, to admit only one mode therethrough, and a polarizer. The fiber grating of this invention is used in combination with a directional coupler instead of a mode stripper and a polarizer. The fiber-optic device outputs desired wavelengths, a switching signal or an interference signal. An external perturbation, such as a strain, a temperature, light pulse, and etc. may be applied to the fiber grating in its preparation to change a characteristic of the fiber grating. These perturbations are actively used to make fiber-optic devices and sensors.

9 Claims, 9 Drawing Sheets

FIBER-OPTIC DEVICES AND SENSORS USING FIBER GRATING

BACKGROUND OF THE INVENTION

1. Field of the Invention

The present invention relates in general to fiber-optic devices, and more particularly to a fiber-optic device prepared using a mode coupling fiber grating and being suitable for using as a wavelength filter, a polarizer, an optical switch, a wavelength division multiplexer, a strain sensor, a temperature sensor and etc.

2. Description of the Prior Art

It is well known to those skilled in the art that varieties of materials are used to increase the refractive index of an optical fiber core in preparation of an optical fiber. One of them, such as germanium doped in core, is exposed to an intensive light, its refractive index is changed permanently and, in this regard, such a material is named as a photo-sensitive material. Also, an optical fiber core doped with such a photosensitive material changes its refractive index when it is exposed to such an intensive light. And also, the change of the refractive index of the fiber core is permanent, so that the fiber core remains its changed refractive index even when the optical fiber does not receive the intensive light any longer. Here, when the optical fiber is an optical fiber through which at least two modes propagate, it is possible to induce a change of the refractive index of the fiber core due to an interference of and a propagation constant difference between, and a polarization of the modes, thus to provide an optical fiber in which the refractive index of the core is periodically and spatially changed. Such an optical fiber in which the refractive index of the fiber core is periodically and spatially changed is called a fiber grating which is used in preparation of varieties of optical fiber devices.

A schematic illustration of a mode coupling fiber grating will be given with reference to FIG. 1 showing a mode beat of and a fiber grating preparation theory of a conventional two-mode optical fiber.

When at least two modes propagate through an optical fiber, these modes propagate with different propagation constants, respectively. Especially in the elliptical-core two-mode optical fiber, two modes propagate stably through the optical fiber with different propagation constants. The $LP_{01}$ mode of the two mode optical fiber shows an electric field distribution of the incident light which is symmetric radially while the electric field distribution of the $LP_{11}$ mode is antisymmetric in the long-axis direction. During the propagation of the two modes through the two-mode optical fiber, these modes cause a beating in the optical fiber due to a relative phase difference at a point between them and the beat length $L_B$ is changed in accordance with a wavelength and a polarization of an incident light. At this time, the electric field distribution of the lights propagated through the optical fiber causes a constructive interference at one side of the optical fiber core as well as a destructive interference at the other side of the optical fiber core in accordance with the electric field distribution, thus causing intensive light parts to alternately appear at an upper section and a lower section of the optical fiber core at regular intervals equal to the beat lengths $L_B$. Here, when the incident light has a sufficient intensity, the refractive index of the optical fiber core is permanently changed by the photo-sensitive material doped in the optical fiber core as described above, thus to periodically induce asymmetric refractive index distributions $\Delta n$ along the optical fiber.

When the fiber grating, of which the refractive index is permanently changed, is exposed to a weak light, the two modes are coupled due to the periodic distribution of permanent refractive index change of the optical fiber, thereby to result in a mode coupling, i.e., a power exchange of the modes. Let this be represented as following equation (1).

$$A_{(Z)} = B \times K^2 / \{K^2 + (\theta/2)^2\} \sin^2\{K^2 + (\theta/2)^2 Z\} \quad (1)$$

wherein A is the coupling amount, B is the quantity of the incident light, K is a coupling coefficient, $\theta$ is the amount of phase mismatch i.e., a phase difference between the fiber grating period and the beat of the incident light, and Z is the length of the fiber grating.

As will be noted to those skilled in the art, the coupling efficiency of the fiber grating depends upon the phase mismatch $\theta$. In other words, the phase mismatch, $\theta = 0$, results in a complete mode coupling while the phase mismatch, $\theta = 0$, results in an incomplete mode coupling.

For example, when a strain is applied to the fiber grating, the phase mismatch $\theta$ will be represented by the following equation (2).

$$\theta = 2\pi[1/\lambda_0\{1-(\delta l/l_0)\} - 1/LB_0\{1-\alpha(\delta l/l_0)\}] \quad (2)$$

wherein $\delta l$ is an elongated length of the fiber grating and $\lambda_0$ is a grating period.

From the above equation (2), it is noted that the grating period $\lambda_0$ is changed as much as $\delta\lambda/\lambda_0 = \delta l/l_0$ by the strain, and the beat length $L_B$ of the modes of the light propagating through the optical fiber is changed by $\delta L_B/L_{B0} = \alpha(\delta l/l)$.

As a result, the phase mismatch $\theta$ depends upon the change of the fiber grating period $\lambda_0$ as well as the change of the mode beat length $L_B$ of the incident light. Here, it should be noted that the change of the fiber grating period $\lambda_0$ is different from the change of the mode beat length $L_B$ of the incident light, i.e., $\alpha$ is smaller than 1. Owing to such a difference between the change of the fiber grating period and the change of the mode beat length of the incident light, it is possible to control the coupling amount of the fiber grating by adjusting the phase mismatch $\theta$.

In addition, the fiber grating is determined in its characteristics, such as the grating period, in accordance with a wavelength of and a polarization of a writing beam serving to fabricate the fiber grating, and the phase mismatch $\theta$ is different in accordance with a wavelength of and a polarization of a probe beam passing through the fiber grating, thus to change the coupling amount of the fiber grating.

SUMMARY OF THE INVENTION

The present invention concerns fiber-optic devices such as wavelength filters, and fiber optic sensors such as temperature sensors and strain sensors.

The single mode fiber grating which is made of a single mode optical fiber acts at the same wavelength and polarization with the writing beams. Such a fiber grating is used as, for example, a wavelength filter owing to the fact that the light, of which the phase mismatch $\theta$ is zero, is reflected backwards due to the single mode fiber grating. Such a fiber grating is thus used as a reflection type fiber grating. However, this reflection type fiber grating reflects a desired light backwards and this causes a problem that a complex process is required to separate the desired light from the incident light reflected by the fiber grating.

It is an object of the present invention to provide an optical fiber device made of a transmission type fiber grating which is capable of provision of advantages, such as convenience and usefulness, in practical use, and allows the phase mismatch to be actively controlled, thus to directly control and to obtain a desired result, and is wide used in preparation of varieties of optical fiber devices.

A description of a method for preparation of an optical fiber device prepared using the mode coupling fiber grating of this invention will be given hereinbelow.

Preparation of the optical fiber device using the mode coupling fiber grating of this invention is achieved by at least one of the following four methods. First, a desired optical fiber device is prepared using only the transmission type mode coupling fiber grating of this invention. This first method requires a simple process and a desired result is achieved only by changing the length of the fiber grating to be used. Second, an external perturbation is applied to the fiber grating to change a characteristics of the fiber grating, and the changed characteristics of the fiber grating is utilized for fiber-optic device. Third, the fiber grating is fabricated under a specific external perturbation applied thereto, in order to fabricate a fiber-optic device intending to start its intrinsic function at a predetermined level of physical quantity corresponding to the specific external perturbation or in order to extend the control range of the phase mismatch, and thereafter, used in the optical fiber device. When this third method is used in combination with the second method, it is possible to make much various optical fiber devices. Fourth, the fiber grating of this invention is used in combination with a directional coupler. Here, the directional coupler may be selected from an intermodal coupler, coupling spatial modes each other, or a conventional directional coupler. This fourth method is effectively used in preparation of a logical element or of a wavelength division multiplexer. In addition, the combination of the third method with the fourth method is useful in preparation of a sensor, a logical element and an optical device.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

When a fiber grating prepared in accordance with the present invention is probed by light of which the wavelength and the polarization are different from those of the writing beam, the fiber grating is used as a wavelength filter or as a polarizer only by changing its length L. The reason is the fact that the mode coupling is performed at the maximum by the writing beam, however, such a maximum mode coupling does not occur under the condition of the probe beam of which the wavelength and the polarization are different from those of the writing beam. At this time, the desired amount of mode coupling using a desired wavelength or using a desired polarization is simply achieved by changing the length L of the fiber grating as described above.

Figure 1:
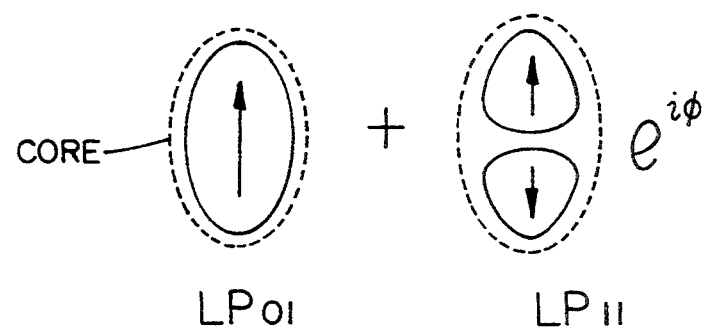
FIG. 1 represents a mode beating of a grating formation and grating structure of a two-mode optical fiber.
Figure 1:
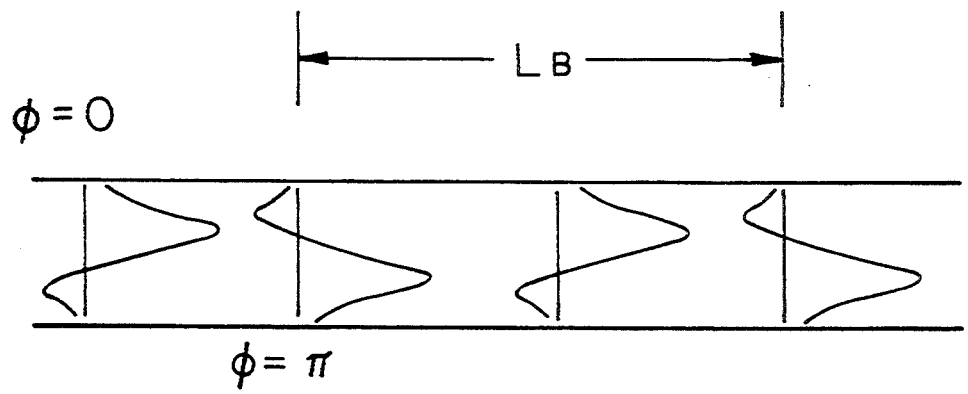
Figure 1:
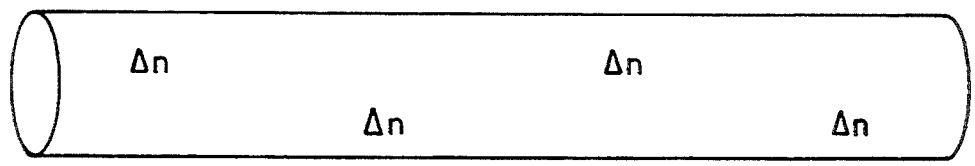
Figure 2A:
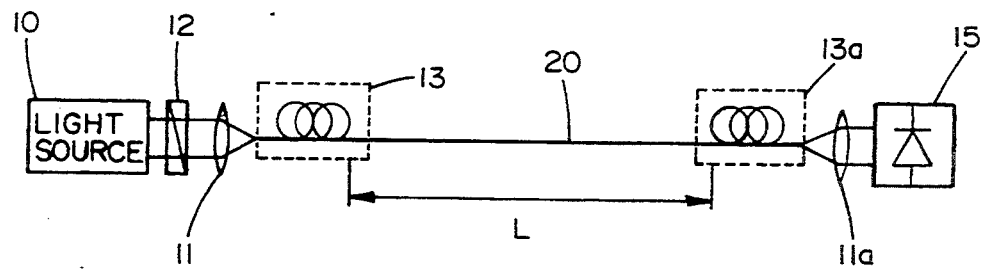
FIGS. 2A to 2D show constructions of wavelength filters or polarizers, which are prepared using mode coupling fiber gratings in accordance with the present invention, respectively.

With reference to FIGS. 2A to 2D, there are constructions of wavelength filters or polarizers, which are made using the transmission type mode coupling fiber gratings fabricated in accordance with the present invention, respectively. Referring first to FIG. 2A, the wavelength filter or the polarizer includes a polarizer 12 for polarizing the light of the light source 10 prior to incidence of the light upon a first objective lens 11. The first objective lens 11 is placed behind the polarizer 12 to launch the polarized light of the polarizer 12 to the fiber grating. Launching the light also can be achieved by splicing the grating and the fiber which delivers light. The wavelength filter or the polarizer of this embodiment further includes an input mode stripper 13, which is placed at the beginning of the grating to excite only one mode at the beginning of the grating. The fiber grating 20 renders an output signal of the mode stripper 13 passing therethrough. In addition, an output mode stripper 13a is placed at the output side of the fiber grating 20 for removing one mode which has not been coupled at the fiber grating 20. Behind the output mode stripper 13a, a second objective lens 11a is placed for making the output signal of the output mode stripper 13a become a parallel beam. However, this lens is not absolutely needed. A detector 15 is added to the wavelength filter or the polarizer of this embodiment to detect the output signal of the second objective lens 11a.

In this case, the desired amount of mode coupling at the wavelength are simply achieved by changing the length L of the fiber grating 20 as described above. As a result, each of the optical devices shown in FIGS. 2A to 2D serves as a notch filter since it contains mode stripper 13a at the output side of the fiber grating 20. In other words, this optical device serves as a wavelength filter for filtering off a desired wavelength or as a polarizer for filtering off a desired polarized light. On the other hand, when the result optical device is used as the polarizer, the polarizer 12 may be removed from the above construction.

Figure 2B:
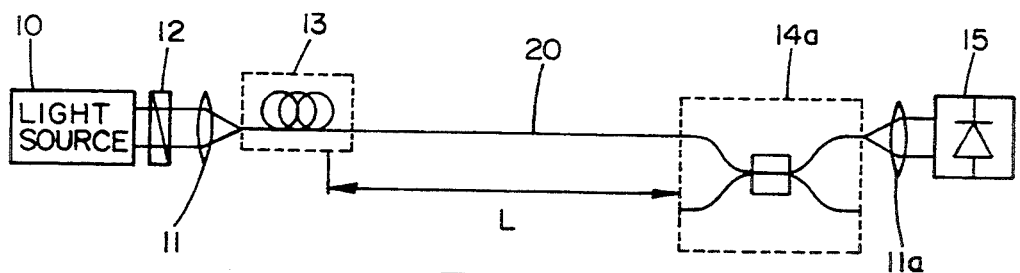
Figure 2C:
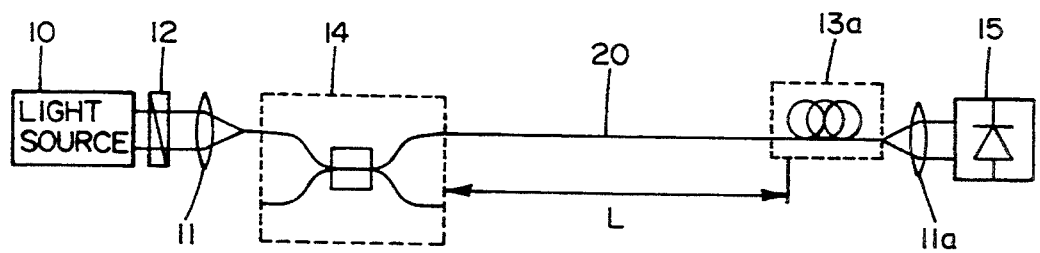

In accordance with another embodiment of this invention, the input mode stripper 13 may be substituted with a directional coupler 14 as shown in FIG. 2C, and this embodiment yields the same result as that described for the preferred embodiment of FIG. 2A without affecting the functioning of this invention.

In addition, substitution of an intermodal directional coupler 14a for the output mode stripper 13a as shown in FIG. 2B is involved in the present invention. In this embodiment, only a mode, coupled at the fiber grating 20, is coupled to the coupling port of the directional coupler 14a, thus to make the result optical fiber device serve as a band pass filter. Otherwise stated, this optical fiber device serves as a wavelength filter for outputting only a desired wavelength or as a polarizer for outputting only a desired polarized light.

Figure 2D:
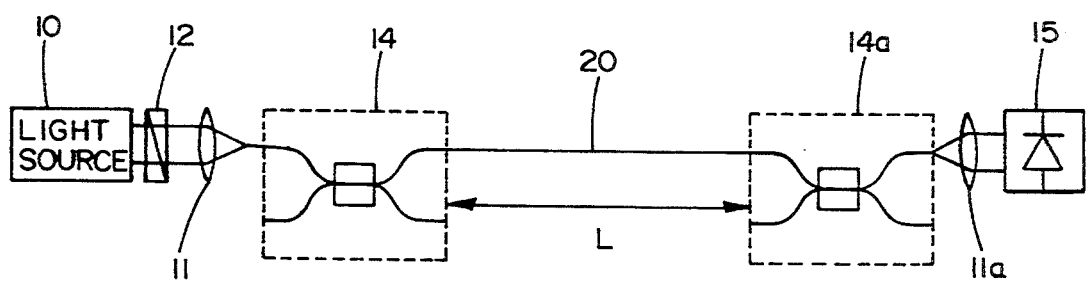

As another embodiment of this invention, the input mode stripper 13 and the output mode stripper 13a may be substituted with directional couplers 14 and 14a, respectively, as shown in FIG. 2D. This embodiment of FIG. 2D yields the same result as that described for the embodiment of FIG. 2B.

At present invention, changing characteristics of the grating by external perturbations is utilized to make fiber-optic devices and sensors such as optical switch and etc.

The reason of change of the characteristics of the fiber grating 20 by the external perturbations is as follows. First, the grating period of this fiber grating 20 is changed by the external perturbations and this causes a change of the characteristics of the fiber grating 20. Second, the beat length $L_B$ of the two modes is changed by the external perturbation and this causes a change of the mode coupling of the fiber grating 20. Third, the external perturbation imparted on the fiber grating 20 induces change of the refractive index of the fiber grating 20 and changes the characteristics of the fiber grating 20. Such a change of the characteristics of the fiber grating 20 results in a change of the phase mismatch $\theta$ of the above equation (1). That is, the change of characteristics of the fiber grating 20 results in break of a phase matching condition. The changed characteristics of the fiber grating 20 are actively used in making varieties of fiber-optic device using the mode coupling fiber grating of this invention. Here, examples of the external perturbation are a strain, a temperature, a light and the like.

When a strain is applied to the fiber grating, no coupling occurs between the modes since the phase matching condition is broken by the strain, and the fact that no coupling does occur between the two modes is used in preparation of an optical switch.

Figure 3A:
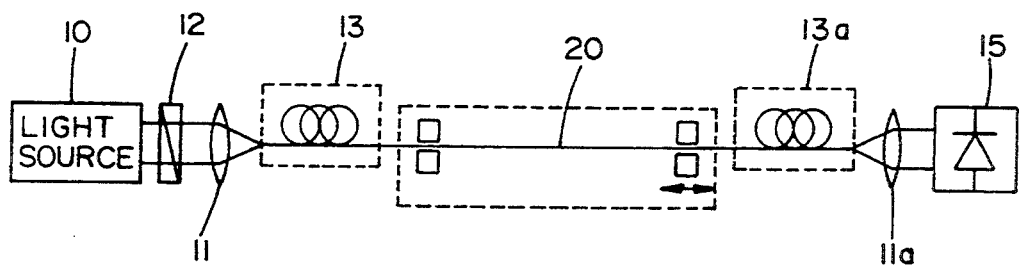
FIGS. 3A to 3D show constructions of optical digital switches utilizing the fiber gratings of the present invention, respectively.
Figure 3B:
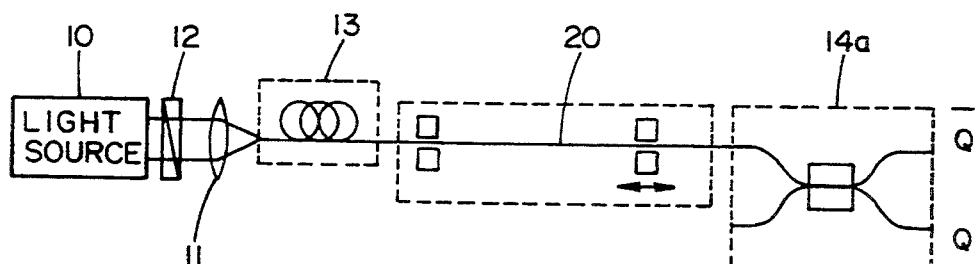
Figure 3C:
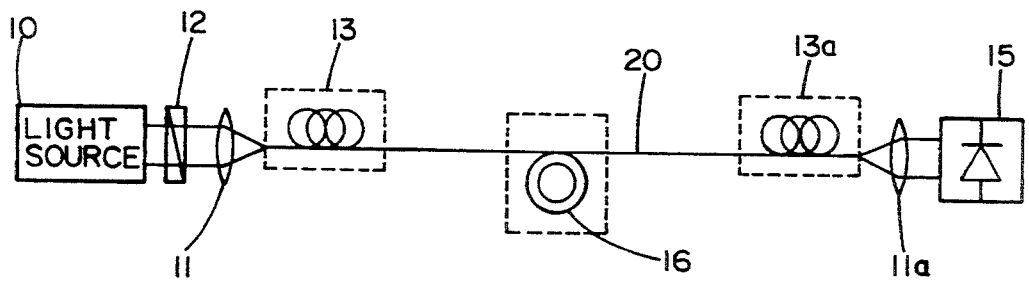
Figure 3D:
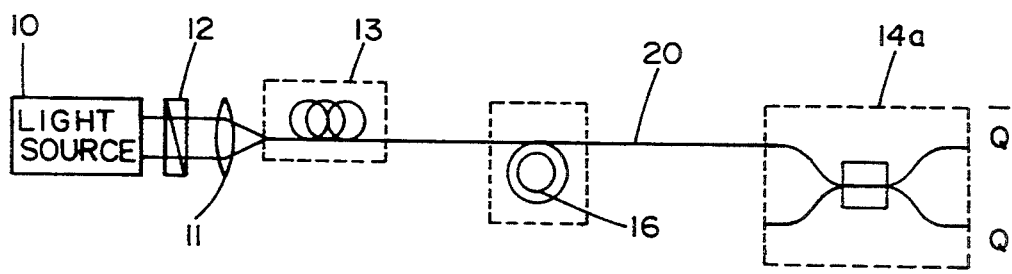

FIGS. 3A to 3D show constructions of optical digital switches prepared using the fiber grating of the present invention, respectively. In these embodiments of FIGS. 3A to 3D, the general shapes of the optical fiber devices remain the same as in the embodiments of FIGS. 2A to 2D, but means for imparting a strain on the fiber grating 20 of each of the optical fiber device is placed between the mode strippers 13 and 13a. Here, the output mode stripper 13a may be substituted with the directional coupler 14a as shown in FIGS. 3B and 3D.

As shown in FIG. 3A, when a mechanical strain generated by a mechanical structure is imparted on the fiber grating 20, the phase matching condition of the fiber grating 20 is broken, thus to result in no mode coupling. This optical fiber device thus serves as a binary switch where the state of mode coupling means an OFF state or 0 state and the state of strain impartment means an ON state or 1 state.

As shown in FIG. 3B, the output mode stripper 13a can be substituted with the directional coupler 14a as described above. The optical fiber device of this embodiment serves as a logical element of which the output is reversed in accordance with determination whether the mechanical strain generated by the mechanical structure is imparted on the fiber grating 20 or not. That is, this optical fiber device serves as a logical element of which the output value of through port Q of the directional coupler 14a is the truth value "1" and the output value of the coupling port Q of the directional coupler 14a is the truth value "0" when the strain is imparted on the fiber grating 20. On the contrary, when no strain is imparted on the fiber grating 20, the output values are opposed to those described above, respectively.

In an embodiment shown in FIG. 3C, the fiber grating 20 is applied with a strain generated by a piezo-electric element 16, made of PZT (lead zirconate titanate), instead of the aforementioned mechanical structure. This fiber-optic device operates in the same manner as that described for the embodiment of FIG. 3A. In accordance with this embodiment of the present invention, the output mode stripper 13a can be substituted with the directional coupler 14a under the condition that the fiber grating 20 is applied with the strain generated by the piezo-electric element 16. This optical fiber device of FIG. 3D operates in the same manner as that described for the embodiment of FIG. 3B. And also input mode stripper 13 can be substituted without affecting the function of optical switch.

On the other hand, the result fiber-optic device of this invention can be used as a polarizer or as a wavelength filter owing to the fact that the fiber grating 20 shows different characteristics when it is applied with a strain in accordance with a polarization and a wavelength. That is, the mode coupling characteristics are changed by phease mismatch, and the phase mismatch can be controlled by applying strain. So we can select wavelength and polarization of incident light by adjusting applied strain. Each of the optical fiber devices shown in FIGS. 3A to 3D switches a light having a predetermined wavelength.

In addition, the combination of the directional coupler with the fiber grating in consideration of the fact that no mode coupling occurs under incidence of the light having the wavelength different from that of the writing beam provides a wavelength division multiplexer (WDM) or an optical logic element. Each of the optical digital switches shown in FIGS. 3A to 3D constitutes a basic unit of the wavelength division multiplexer. In order to provide the wavelength division multiplexer, a plurality of fiber grating functions at different wavelength of FIGS. 3A to 3D are combined together as shown in FIGS. 4A and 4B.

The grating functions at different wavelength can be prepared by applying strain or write at different wavelengths.

Figure 4A:
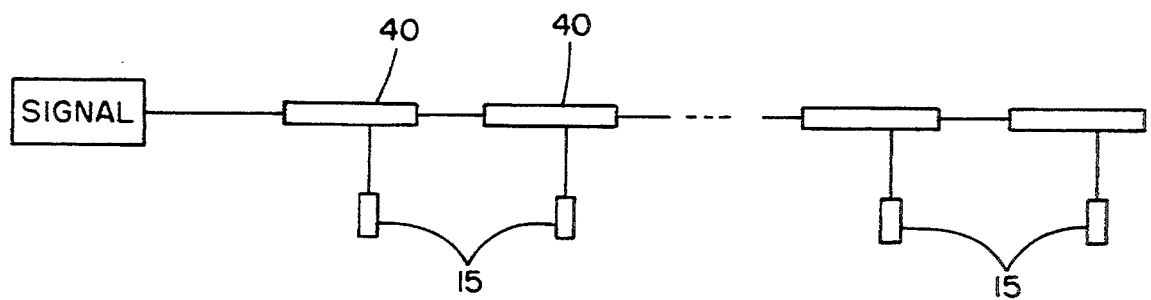
FIGS. 4A and 4B show constructions of wavelength division multiplexers prepared using the fiber gratings of the present invention, respectively.
Figure 4B:
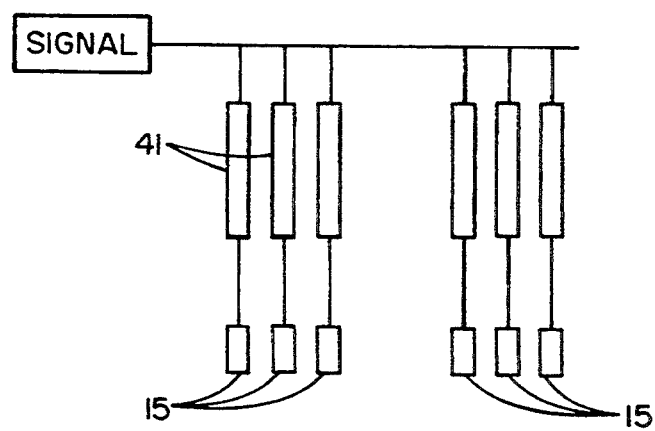

FIGS. 4A and 4B show constructions of the wavelength division multiplexers prepared using the fiber gratings of the present invention, respectively. In an embodiment of the present invention, the wavelength division multiplexer may be prepared by series connection of a plurality of optical digital switches 40 of FIGS. 3B, 3C and 3D at the same time of connection of detectors 15 to individual optical digital switches 40 as shown in FIG. 4A. In another embodiment of the present invention, the wavelength division multiplexer may be prepared by parallel connection of a plurality of logical elements 41 of FIGS. 3A to 3D at the same time of connection of detectors 15 to individual logical elements 41 as shown in FIG. 4B.

On the other hand, when a temperature is given to a portion of the fiber grating 20, which is to be imparted with the strain, the phase matching condition of the fiber grating 20 is broken by the temperature applied to the portion of the fiber grating 20, thus to result in change of the mode coupling. Thus, the temperature is measured from the output signal and, in this regard, this optical fiber device serves as a temperature control element, such as a bimetal. That is, the optical fiber device serves as an optical switch by changing the temperature.

When using the aforementioned theory, an interferometric sensor comprising a single line of optical fiber can be prepared using the fiber grating.

Figure 5A:
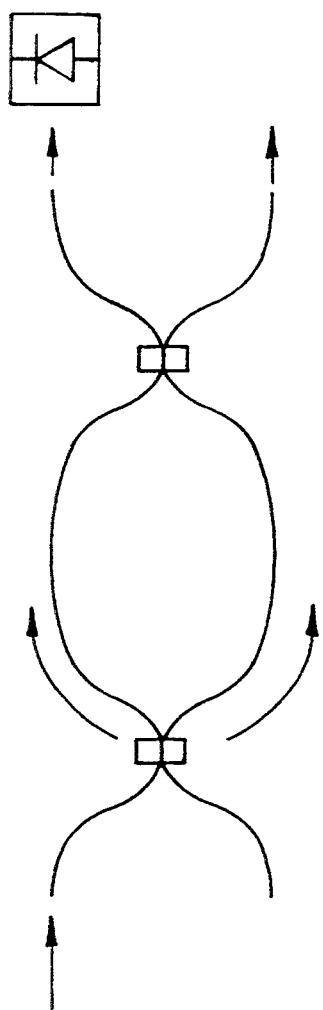
FIGS. 5A and 5B show constructions of interferometric fiber-optic sensors prepared using the fiber gratings of the present invention, respectively.
Figure 5B:
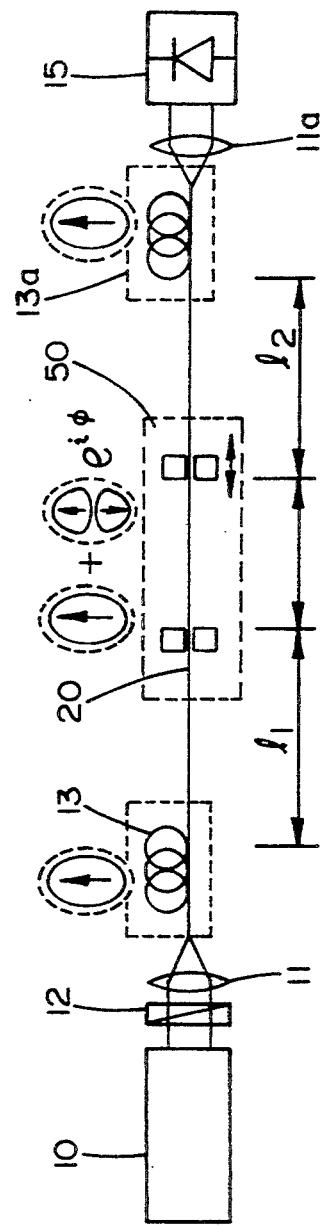
Figure 6A:
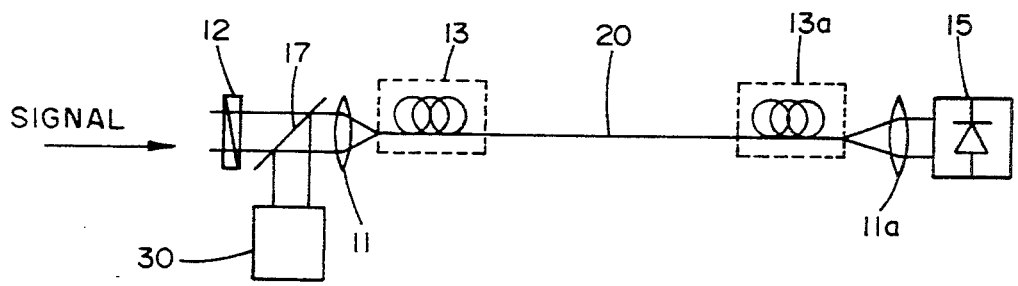
FIGS. 6A to 6H show constructions of all optical switches prepared using the fiber gratings of the present invention, respectively.
Figure 6B:
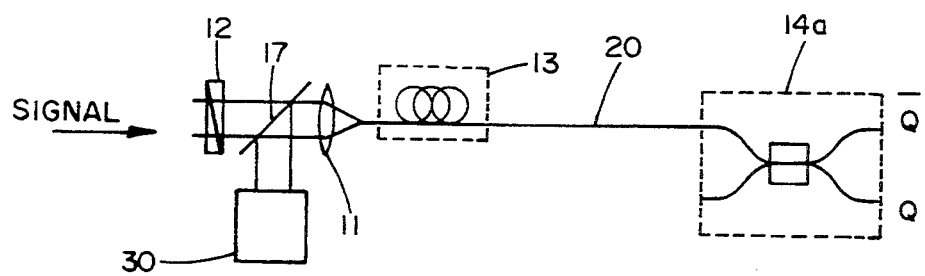
Figure 6C:
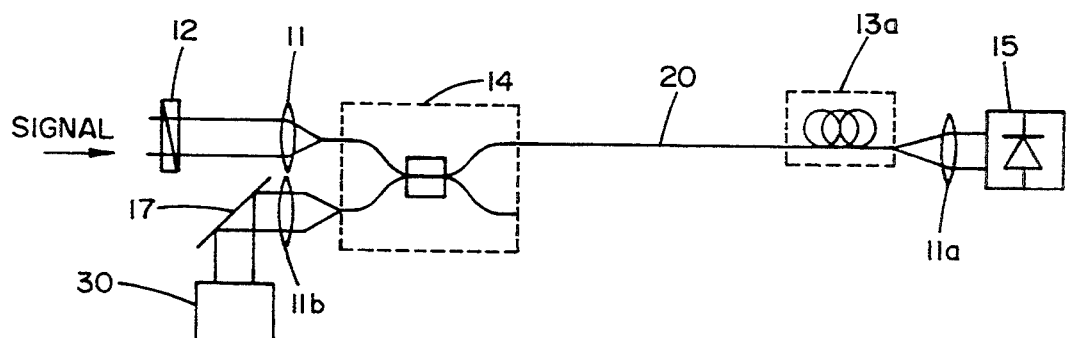
Figure 6D:
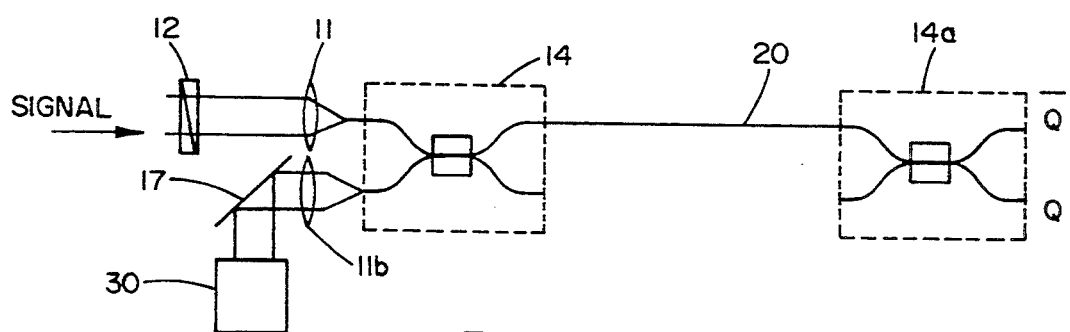
Figure 6E:
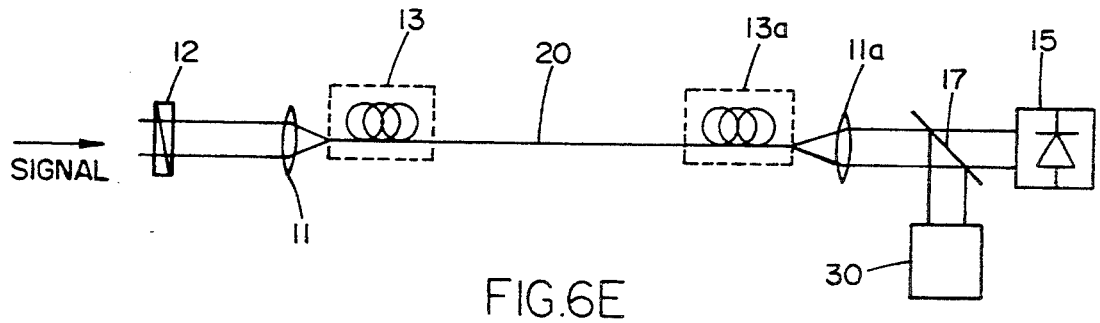
Figure 6F:
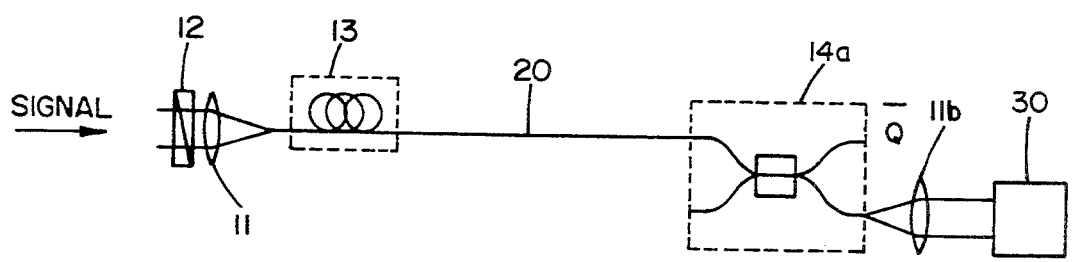
Figure 6G:
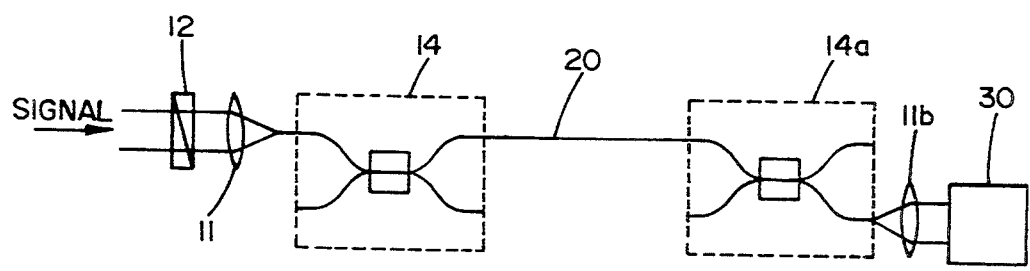
Figure 6H:
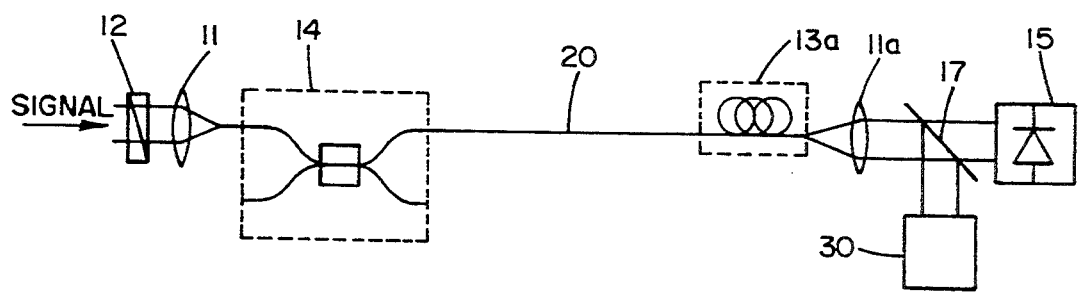

With reference to FIGS. 5A and 5B, FIG. 5A shows a Mach-Zehnder interferometer prepared with directional couplers, and FIG. 5B shows an interferometer prepared using the fiber grating of the present invention. This single line interferometer can be utilized as sensors. This interferometer sensor comprises a single line of optical fiber by virtue of the intrinsic characteristic of the fiber grating 20. In the interferometric sensor of FIG. 5B, the light of the light source 10 is received by the fiber grating 20 through the polarizer 12, the objective lens 11 and the input mode stripper 13 in such a manner that the polarized light and one mode are launched at the fiber grating 20 which serves as a mode coupler. Thereafter, the incident light is rendered passing through a sensing part 50 under the condition that the input length $l_1$ of the fiber grating 20 is adjusted so as to make a half of the $LP_{01}$ mode received by the fiber grating 20 be coupled to the $LP_{11}$ mode. The light, which experienced with external perturbations or quantity to measure, during passing through the sensing part 50, in turn passes through the output side of the fiber grating 20 under the condition that the output length $L_2$ of the fiber grating 20 is adjusted so as to cause the two modes $LP_{01}$ and $LP_{11}$ to be coupled together in the ratio of 1 to 1, thus to provide the desired interferometer or the desired interferometric sensor. Otherwise stated, this sensor of the interferometer type is obtained by substituting the fiber grating 20 for a directional coupler of a general interferometer and by making the two arms of the sensing part 50 have two modes.

This type of interferometer sensor provides an advantage that the interferometer comprises only a single line of optical fiber with no directional coupler and, as a result, has a simple construction and reduces the manufacturing cost and this makes the same effects be expected. In addition, the light passes through the same passage, so that a pulse light source is efficiently used. Another advantage of this interferometer sensor is resided in that the light is applied with the undesirable external perturbation, thus to reduce the noise. By virtue of the above advantages, much convenience is expected in practical use of the sensor. Furthermore, differently from the conventional dual mode interferometer which is necessarily provided with a directional coupler or an intermodal coupler to show the $LP_{11}$ mode or the $LP_{01}$ mode, the interferometric sensor of the present invention requires only a single line optical fiber grating. When a specific sensing material is added to the sensing part 50 of the interferometric sensor of this invention, any physical quantity can be measured. For example, addition of a metallic glass to the sensing part 50 renders the magnetic field measured, and addition of the piezo-electric element to the sensing part 50 renders the voltage measured. Especially, the interferometric sensor of this invention serves as a temperature sensor in addition of no sensing material.

In accordance with the present invention, the phase matching condition of the fiber grating is optically broken by rendering a pumping beam of the pulse type to the fiber grating, thus to allow the result fiber-optic device to be used as a all optical switches. Here, the phase matching condition of the fiber grating is optically broken due to the change of refractive index of the fiber grating as a result of the Kerr effect. The general constructions of the all optical switches remain the same as in the embodiments of FIGS. 2A to 2D, but the phase matching condition of the fiber grating 20 is broken by incidence of a light which induces in the fiber grating 20 instead of impartment of the strain on the fiber grating 20 and the change of the refractive index of the fiber grating 20. The change of the refractive index being proportional to the light intensity. In order to achieve the above construction of the optical switch, a structure for incidence of the pumping beam should be added to each of the switches shown in FIGS. 2A to 2D.

FIGS. 6A to 6H show constructions of the all optical switches prepared using the fiber gratings of the present invention, respectively. In each of the embodiments shown in FIGS. 6A to 6D, the fiber grating 20 receives at its input side the pumping light generated by a pumping light source 30, while in each of the embodiments shown in FIGS. 6E to 6H, the fiber grating 20 receives at its output side the pumping light generated by the pumping light source 30. If described in detail, each of the all optical switches of FIGS. 6A and 6B renders pumping light of the pumping light source 30 incident upon the first objective lens 11 of FIG. 2A or 2B through a beam splitter 17. Each of the all optical switches of FIGS. 6C and 6D renders the pumping light of the pumping light source 30 incident upon the directional coupler 14 of FIG. 2C or 2D through a third objective lens 11b. Each of the all optical switches of FIGS. 6E and 6G renders the pumping light of the light source 30 incident upon the second objective lens 11a of FIG. 2A or 2C through the beam splitter 17. Each of the all optical switches of FIGS. 6F and 6H renders the pumping light of the pumping light source 30 incident upon the directional coupler 14s of FIG. 2B or 2D through the third objective lens 11b. From the above description, it will be apparent to those skilled in the art that the same result is yielded irrespective of incidence direction of the pumping light of the pumping light source 30, otherwise stated, the all optical switch of this invention can be prepared by incidence of the pumping light of the pumping light source 30 upon the input side of or upon the output side of the fiber grating 20.

When using a light in order for switching as described for these all optical switches, several advantages are expected. First, the control is optically performed, so that the switching operation is carried out faster than the switches of FIGS. 2A to 2D. Second, the use of light in switching operation provides an usefulness of the fiber grating devices in the all optical communication.

Since the phase mismatch $\theta$ is controlled by adjusting the intensity of the pumping light of the pumping light source 30, the switching operation of the all optical switch of this invention can select wavelength by appropriate pumping in accordance with the wavelength, thus to serve as a wavelength division multiplexer.

The present invention also involves preparation of an optical fiber device using a fiber grating, the fiber grating being prepared with an external perturbation applied thereto in its preparation. Here, examples of the external perturbation are a strain, a change of temperature, a light of a wavelength different from that of the writing beam, and etc.

Applying the strain, as an external perturbation, during writing process of the fiber grating, gives two advantages. First we can adjust the amount of the grating period by strain from negative to positive compared to that of writing. Second, the fiber grating shows a characteristic in that it specifically responds to the predetermined strain applied thereto in its preparation. Thus the control range of the phase mismatch is enlarged. This characteristic of the fiber grating is efficiently used for feedback control.

Figure 7A:
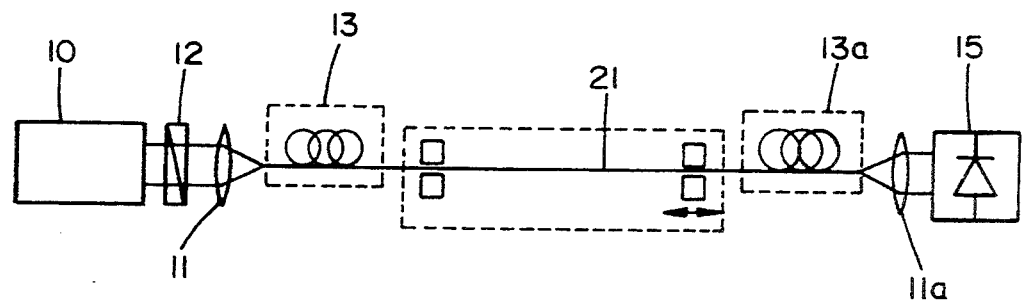
FIGS. 7A to 7D show constructions of wavelength filters or polarizers prepared using fiber gratings, each fabricated with a strain applied thereto during writing process, in accordance with the present invention, respectively.
Figure 7B:
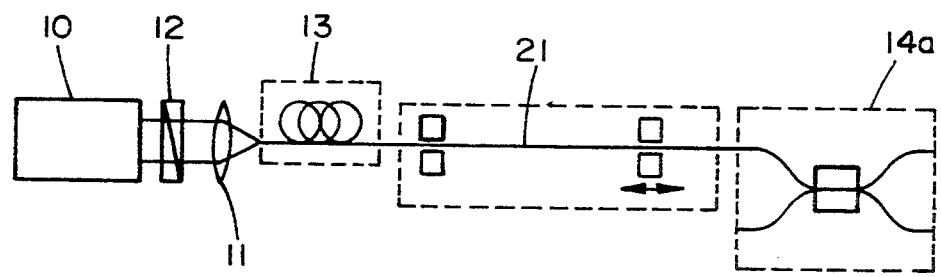
Figure 7C:
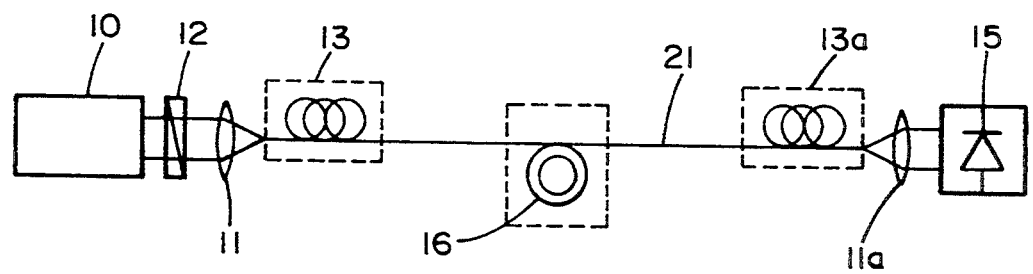
Figure 7D:
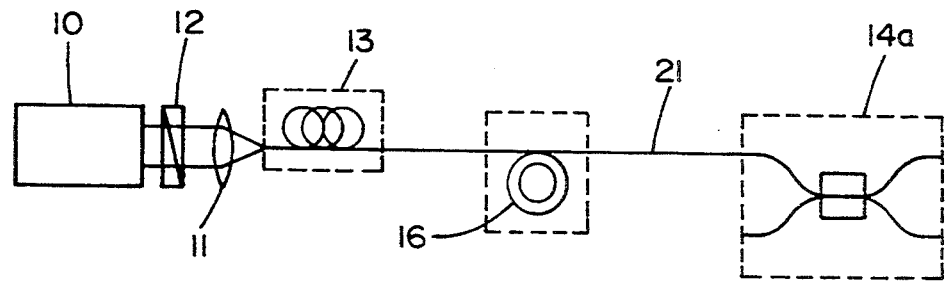

FIGS. 7A to 7D show constructions of wavelength filters and polarizers, each prepared using the fiber grating prepared with the strain applied thereto during writing process in accordance with the present invention. The general constructions of these optical fiber devices remain the same as in the embodiments of FIGS. 2A to 2D, respectively, but a fiber grating 21 which has been prepared with the stress in its preparation is substituted for the fiber grating 20. In the same manner as described in the embodiments of FIGS. 3A to 3D, each of the fiber gratings 21 of FIGS. 7A and 7B is added with the mechanical structure for applying the strain to the fiber grating 21, and each of the fiber gratings 21 of FIGS. 7C and 7D is added with the PZT element for applying the strain to the fiber grating 21. By virtue of the above constructions, each of the optical fiber devices of FIGS. 7A to 7D can be used as a tunable wavelength filter or as a polarizer.

Of course, it is apparent to those skilled in the art that there has been proposed a fiber grating prepared with a strain in its preparation. However, this known fiber grating with the strain uses a fixed wavelength and renders the mode coupling carried out at the maximum at a predetermined wavelength.

Different from the above known fiber grating prepared with the strain, the fiber-optic device of FIG. 7A of this invention can be used as a wavelength filter due to the fact that when the fiber grating 21 is applied with a different strain, the phase mismatch $\theta$ of the fiber grating 21 is controlled, thus to render perfect mode coupling occur at the desired wavelength. On the other hand, in order to use the optical fiber device of FIG. 7A as a polarizer, the fiber grating 21 is prepared by the fact that the beat length differs in accordance with the polarization of light. Thus, by controlling the strain particular polarization state of probing light can be selected. If briefly described, the fiber grating 21 of the present invention is wide used for selecting light of particular wavelength and/or polarization by controlling the strain.

As described above, the fiber grating prepared with the strain applied thereto in its preparation shows the maximum coupling at the predetermined strain.

Figure 8A:
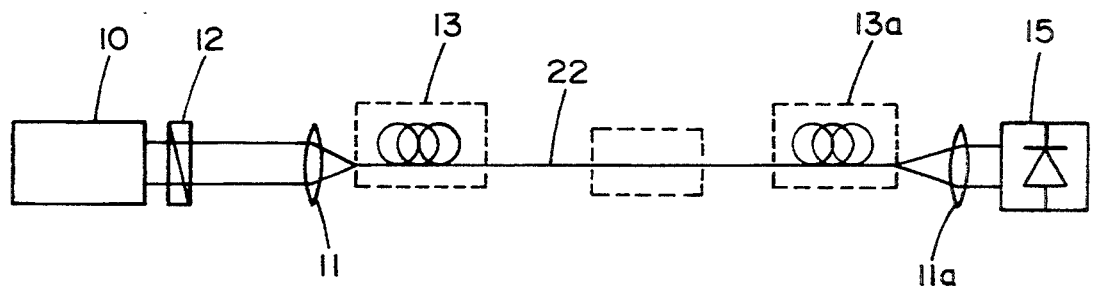
FIGS. 8A and 8B show constructions of a temperature switch and a temperature sensor prepared using fiber gratings, each prepared with a temperature applied thereto in its preparation, in accordance with the present invention, respectively.
Figure 8B:
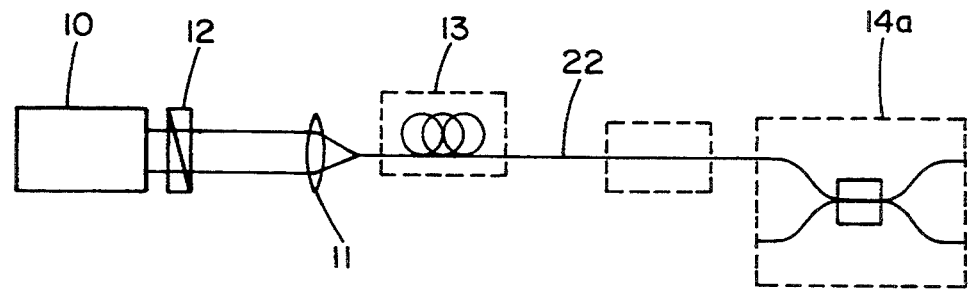

FIGS. 8A and 8B show constructions of a temperature switch and a temperature sensor, each prepared using a fiber grating prepared with a temperature applied thereto. The general constructions of these fiber-optic devices remain the same as in the embodiments of FIGS. 7A and 7B, but a fiber grating 22 which has been prepared with the specific temperature rather than strain in the grating 21.

When the temperature, as an external effect, is applied to the fiber grating 22, this fiber grating 22 shows the maximum coupling at the predetermined temperature which is correspond to the temperature applied to the fiber grating 22 in the preparation of the fiber grating 22. Thus, when the temperature of the fiber grating 22 reaches the predetermined temperature, the output of the optical fiber device of FIG. 8A becomes "0" while the output of the optical fiber device of FIG. 8B becomes "1". Hence, these optical fiber devices of FIGS. 8A and 8B are used as feedback control sensors. That is, each of these optical fiber devices is used as a temperature sensor or a relay of a constant-temperature equipment. Especially, when a light source of a wide wavelength width is used for the optical fiber devices of FIGS. 8A and 8B, each of these optical fiber devices measures the wavelength distribution of the output light and determines which light of a wavelength is switched, thus to sense the temperature.

On the other hand, an optical switch is prepared using the fiber grating 21, which is prepared with the strain applied thereto in its preparation. Thereafter, a wavelength division multiplexer is prepared using the above optical switch in the same manner as described for the embodiments of FIGS. 4A and 4B, this wavelength division multiplexer performs the wavelength dividing operation in a wavelength range wider than those of the wavelength division multiplexers of FIGS. 4A and 4B. In addition, this wavelength division multiplexer improves the quality of wavelength separation from the other wavelengths.

As described above, the present invention provides a mode coupling fiber grating which remarkably improves the convenience as well as the usefulness inn its practical use. The invention also provides active controlling of the phase mismatch and this is utilized for fiber-optic devices. The fiber-optic devices and sensors presented above controll the phase mismatch in varieties of methods to obtain desired results. The present invention provides devices and sensors such as fiber-optic devices used in an optical communication, an optical computerizing and optical sensors, and it also can be used in combination with a directional coupler.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A fiber optic apparatus using an optical fiber grating, comprising:
   a. an optical fiber grating in which a grating structure is written in an optical fiber having a longitudinal axis, said optical fiber having a core with a refractive index distribution designed to support a first optical propagation mode and a second optical propagation mode for an optical signal propagating through the optical fiber, said core being doped with germanium, and the germanium being exposed by a writing light having a intensity distribution in a cross-sectional pattern and in a period along the longitudinal axis of said optical fiber, such that the refractive index of said core is increased permanently in said cross-sectional pattern and said period along the longitudinal axis of the optical fiber, said grating structure being defined by an incremental amount of said refractive index, said cross-sectional pattern, and said period along said longitudinal axis, said grating structure causing optical energy coupling of the optical signal between said first optical propagation mode and said second optical propagation mode;

b. a signal light source for introducing an optical signal into said optical fiber grating;

c. means, located between said light source and said optical fiber grating, for introducing only the first optical propagation mode into said optical fiber grating;

d. means, located at a distal end of said optical fiber grating from said signal light source, for selecting only said second optical propagation mode, said second optical propagation mode being generated from said first optical propagation mode by optical energy coupling in said optical fiber grating, such that said second optical propagation mode has an intensity which is a function of the amount of said optical energy coupling; and e. means for perturbing said optical fiber grating by applying an external perturbation to said optical fiber grating, said perturbing means including a mechanical element for applying a strain to said optical fiber grating along said longitudinal axis, such that said grating structure is changed proportional to the applied strain and the amount of optical energy coupled between said first optical propagation mode and second optical propagation mode is controlled by the applied strain.

2. The apparatus of claim 1, wherein the intensity of the output form said selecting means is controlled by the strain applied to said optical fiber grating.

3. The apparatus of claim 1, wherein said perturbing means includes a source of pump light for introducing a high intensity pump light to said optical fiber grating, with the refractive index of the core being changed proportional to the intensity of said pump light by nonlinear effects of said optical fiber, such that the amount of optical energy coupling is changed proportional to the intensity of the pump light, and the output from said selecting means is controlled by the intensity of the pump light.

4. The apparatus of claim 1, wherein said signal light source introduces an optical signal having at least two wavelengths into said optical fiber grating, with the wavelength of the output light from said selecting means being dependent upon the amount of optical energy coupling in said optical fiber grating, and said grating structure being changed proportional to the strain, such that the amount of optical energy coupling and the wavelength of the output from said selecting means are controlled by the magnitude of the applied strain.

5. The apparatus of claim 4, wherein said perturbing means includes a mechanical element for applying heat to said optical fiber grating, with the amount of optical energy coupling being changed by the applied heat, such that the wavelength of the output from said selecting means is controlled by the applied heat.

6. The apparatus of claim 4, wherein said perturbing means includes a source of pump light for introducing high intensity pump light into said optical fiber grating to change the amount of optical energy coupling by nonlinear effects, such that the wavelength of the output from said selecting means is controlled by the intensity of the pump light.

7. The apparatus of claim 1, wherein said signal light source introduces an optical signal having two polarizations into said optical fiber grating, with the amount of optical energy coupling being dependent upon the polarization of the optical signal, and said grating structure being changed by the strain, such that the amount of optical energy coupling and the polarization of the output form said selecting means are controlled by the applied strain.

8. The apparatus of claim 7, wherein said perturbing means includes a mechanical element for applying heat to said optical fiber grating, such that the polarization of the output from said selecting means is controlled by the applied heat.

9. The apparatus of claim 7, wherein said perturbing means includes a source of pump light for introducing high intensity pump light into said optical fiber grating to change the amount of optical energy coupling by nonlinear effects in the optical fiber grating, such that the polarization of the output from said selecting means is controlled by the intensity of the pump light.

* * * * *

UNITED STATES PATENT AND TRADEMARK OFFICE
CERTIFICATE OF CORRECTION

PATENT NO. : 5,444,803
DATED : August 22, 1995
INVENTOR(S) : Byoung Y. Kim, et al.

It is certified that error appears in the above-indentified patent and that said Letters Patent is hereby corrected as shown below:

Column 10, line 40: "inn" should read --in--

Column 11, line 39, Claim 2: "form" should read --from--

Column 12, line 34, Claim 7: "form" should read --from--

Signed and Sealed this

Fifth Day of March, 1996

Attest:

BRUCE LEHMAN

*Attesting Officer*     *Commissioner of Patents and Trademarks*